United States Patent [19]

Woodbridge

[11] 4,172,019

[45] Oct. 23, 1979

[54] METHOD AND APPARATUS FOR PREVENTING AGGLOMERATION WITHIN FLUID HYDROCARBONS

[76] Inventor: David D. Woodbridge, 1209 St. Agnes La., Apt. E, Catonsville, Md. 21207

[21] Appl. No.: 854,023

[22] Filed: Nov. 23, 1977

Related U.S. Application Data

[63] Continuation of Ser. No. 720,607, Sep. 7, 1976, abandoned.

[51] Int. Cl.² .......................... B01J 1/10; B01K 1/00
[52] U.S. Cl. .............................. 204/162 HE; 250/436; 250/527
[58] Field of Search .................. 204/162 HE; 250/436, 250/527

[56] References Cited

U.S. PATENT DOCUMENTS

| | | | |
|---|---|---|---|
| 2,867,572 | 1/1959 | German et al. | 204/162 HE |
| 2,905,610 | 9/1959 | Wigner | 204/162 HE |
| 2,976,422 | 3/1961 | Hill et al. | 204/162 HE |
| 3,055,818 | 9/1962 | McArthur et al. | 204/162 HE |
| 3,094,472 | 6/1963 | Greenwald et al. | 204/162 HE |
| 3,153,622 | 10/1964 | Humphrey et al. | 204/162 HE |
| 3,177,132 | 4/1965 | Wilson et al. | 204/162 HE |
| 3,602,712 | 8/1971 | Mann et al. | 250/436 |
| 3,889,123 | 6/1975 | Bosshard | 250/436 |
| 3,974,391 | 8/1976 | Offermann | 250/436 |

*Primary Examiner*—Leland A. Sebastian
*Attorney, Agent, or Firm*—Duckworth, Hobby, Allen & Pettis

[57] ABSTRACT

This invention relates to a process for treating a fluid hydrocarbon fuel for retarding the agglomeration between particles thereof and for retarding the growth of bacteria and fungi therein. The process includes the steps of transporting a plurality of unit volumes of said fluid hydrocarbon fuel through an irradiating location and irradiating each unit of the plurality of unit volumes at the irradiating location with either neutron or gamma radiation. An apparatus for treating the fluid hydrocarbon fuels with the nuclear radiation also is provided. The apparatus includes a generally conical central irradiating cavity which is surrounded by a spiral outer irradiating cavity. The fluid hydrocarbon fuel is transported through the cavities while being irradiated by the nuclear radiation.

16 Claims, 6 Drawing Figures

METHOD AND APPARATUS FOR PREVENTING AGGLOMERATION WITHIN FLUID HYDROCARBONS

This is a continuation of application Ser. No. 720,607 filed Sept. 9, 1976 now abandoned.

BACKGROUND OF THE INVENTION

1. Field of the Invention

The present application relates to a process and apparatus for treating fluid hydrocarbon fuels with neutron or gamma radiation for retarding agglomeration between the particles thereof, for retarding the growth of bacteria and fungi therein, and for increasing the normal combustion efficiency of the fuel after prolonged periods of storage, and thereby reducing the hydrocarbon pollutants produced during the combustion process.

2. Description of the Prior Art

Nuclear radiation has been utilized in the prior art for shortening molecular chains of organic molecules, lengthening molecular chains of organic molecules, cross linking molecular chains of organic molecules and for promoting or retarding chemical reactions between molecular chains of organic molecules.

In contrast, the present application relates to the use of nuclear radiation, and in particular to the use of neutrons and/or gamma rays to irradiate fluid hydrocarbons, and especially fluid hydrocarbon fuels, for retarding the agglomeration process which naturally occurs between the particles of the fluid hydrocarbon during storage and subsequent heating. Agglomeration may be generally defined as the process by which a mass of precipitation grows by assimilating other precipitation particles which in the course of normal thermal activity collide with the precipitation mass and therefore become part thereof. The probability of two like hydrocarbon molecules agglomerating or coalescing may be reduced by irradiating the molecules with nuclear radiation. Experimentation has shown that gamma radiation will perform satisfactorily in reducing the probability of agglomeration, but neutron radiation, at least within a suitable range of intensities, appears to be the most efficient method of reducing agglomeration between the hydrocarbon molecules. While this invention is described with relation to liquid hydrocarbon fuels such as kerosene, jet fuel, RP-1 rocket fuel, diesel fuel and gasoline, the general process and apparatus disclosed herein may be used with similar success upon other hydrocarbons.

The prior art includes several examples of the use of nuclear energy for treating and changing the physical characteristics of hydrocarbons. For example, Natland, in U.S. Pat. No. 3,297,537, discloses a method and apparatus for treating crude oil for facilitating the long distance transportation through pipelines. Natland transports the thick and viscous crude petroleum oil through the moderator sections of a nuclear reactor, thereby allowing the crude oil to absorb heat generated by the nuclear reaction. This heat is normally transferred to the crude petroleum oil by thermal neutrons (as compared with fast neutrons). The additional heat added to the crude petroleum oil decreases the viscosity of the oil and thereby reduces the energy required to pipe the crude oil over long distances. Stoops in U.S. Pat. No. 2,954,334, discloses the method of circulating lubricating oil together with an olefin additive through the moderating sections of an atomic nuclear reactor. In addition to the normal heating which occurs, as described in the previous application, the lubricating oil and olefin additives absorb high energy neutrons which act as a catalyst in the chemical grafting or combination of the olefin chain onto the molecular structure of the lubricating oil. This chemical reaction improves the viscosity index of the lubricating oil. Another similar chemical reaction catalyzed by the presence of nuclear particles is disclosed by Ogorzaly, in U.S. Pat. No. 3,085,057, which describes the conversion of cetane to obtain a polymerized product having a high viscosity index.

Kline, in U.S. Pat. No. 3,137,633, discloses a method for polymerizing or depolymerizing organic compounds of various molecular weights by exposing the organic substances to large concentrations of high energy gamma rays. This process of gamma irradiation of the polymers can in some instances promote cross linking between the molecular chains and inhibit crazing of the molecular chains, while in other cases the molecules forming the complex polymer are caused to disengage. The use of high energy gamma rays in the conversion of petroleum naphtha to a higher octane product is disclosed by Wigner in U.S. Pat. No. 2,905,610.

Other uses of nuclear radiation for effecting the probability of chemical reactions are disclosed by Hamling, in U.S. Pat. No. 3,378,451, Bolt et al, in U.S. Pat. No. 3,238,113, Bolt et al in U.S. Pat. No. 3,123,534, Voorhees in U.S. Pat. No. 2,958,637; Schutze et al in U.S. Pat. No. 2,914,452; Schlicht et al in U.S. Pat. No. 3,283,814; and Hentz in U.S. Pat. No. 3,258,404. Other prior art references include Natland in U.S. Pat. No. 3,109,781; Denison in U.S. Pat. No. 3,425,111 and Ransohoff in U.S. Pat. No. 3,269,915.

SUMMARY OF THE INVENTION

This invention relates to a process for treating fluid hydrocarbon fuel for retarding the agglomeration between the molecules thereof and for retarding the growth of bacteria and fungi therein. The process includes the steps of: (a) transporting a plurality of unit volumes of the fluid hydrocarbon fuel through an irradiating location; and (b) irradiating each unit volume of the hydrocarbon fuel at the irradiating location with either neutron radiation or gamma radiation.

An apparatus for treating the fluid hydrocarbon fuels according to the above-described process includes an irradiating cavity defined by a first inner surface and a second outer surface placed generally colsterally therefrom. The irradiating cavity includes inlet means and outlet means coupled thereto for enabling a flow of the fluid hydrocarbon fuel through the irradiating cavity. A source of neutron and/or gamma radiation irradiates each unit volume of the fluid hydrocarbon fuel within the irradiating cavity. Shield means are included for absorbing and attenuating nuclear radiation passing through the irradiating cavity without being absorbed by the fluid hydrocarbon fuel.

THE DRAWINGS

Other objects, features and advantages of this invention will be apparent from a study of the written description and the drawings in which.

DETAILED DESCRIPTION OF THE PREFERRED EMBODIMENT

I. Method

Figure 1:
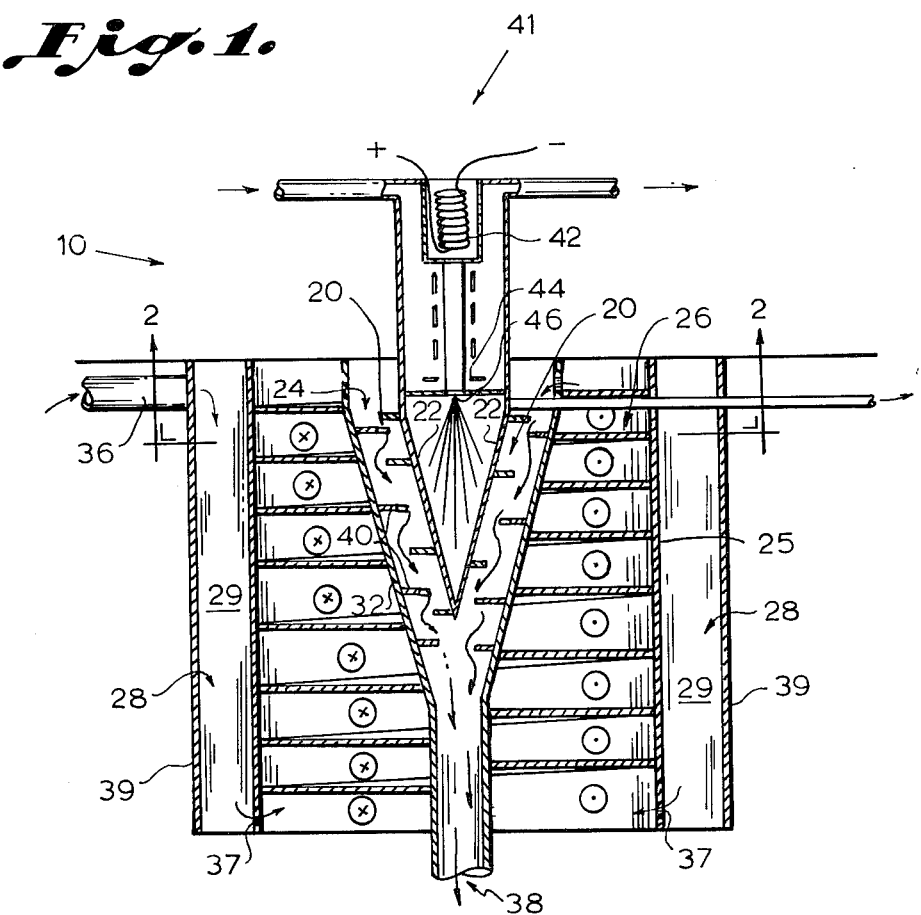
FIG. 1 is a frontal cross-section view of an apparatus for irradiating fluid hydrocarbon fuels with nuclear radiation for retarding the agglomeration between the particles thereof.

The present invention relates to a method and apparatus for irradiating fluid hydrocarbon fuels with nuclear energy for retarding the agglomeration between the molecules forming the hydrocarbon fuel. Agglomeration may be generally defined as the process by which the precipitation cloud or mass grows subsequent to the collision with and assimilation of other precipitation masses. The typical fluid hydrocarbon fuel has a relatively long molecular structure. When this molecular structure is heated, such as during the precombustion compression stroke in an internal combustion engine, the hydrocarbon molecules tend to coalesce and agglomerate into large amorphous masses. When this agglomeration process occurs prior to the combustion or oxidation of the hydrocarbon fuel, the complex molecular aggregation, or agglomerate, greatly retards the rapid oxidation of the hydrocarbon molecules. In the case of an internal combustion engine, the duration of the combustion stroke is sufficiently short to prevent the complete oxidation or combustion of large agglomerate masses of hydrocarbon molecules. This incomplete combustion produces many hydrocarbon byproducts, thereby decreasing the combustion efficiency by expelling unoxidized and energy-containing hydrocarbons. Growing public concern for energy conservation and clean air indicates that newer methods and processes must be developed for increasing the efficiency of the combustion process, especially in the internal combustion engine, and decreasing the pollutants produced as byproducts from the combustion process.

Research has also shown that certain strains of bacteria and fungi grow and multiply rapidly when suspended in or upon such fluid hydrocarbon fuels as kerosene, jet engine fuel, gasoline, etc. Examples of these bacteria and fungi include at least four types of Pseudomonas bacteria, two types of miccrocius bacteria, and one type of fusarlum fungi. Large masses of these bacteria and fungi may eventually obstruct fuel systems, obstruct carburetor passages, and cause significant perturbations in the combustion wavefront which occurs in an internal combustion engine during the combustion stroke. When these bacteria and fungi strains are allowed to propagate during extended periods of fuel storage, they may contaminate the fuel to such an extent that it may become unusable. Proper nuclear irradiation of hydrocarbon fuels destroys the great majority of these bacterial and fungi strains, and prevents them from propagating thereby greatly extending the useable storage periods for the fuels. Periodic irradiation and filtration of the fuels allows a nearly unlimited storage period without concern for bacterial and fungicidal contamination of the fuel.

Furthermore, proper irradiation of the hydrocarbon fuel with certain types of nuclear radiation greatly retards the propensity for agglomeration between the molecular particles during the preheating which precedes the combustion or oxidation process. Since the mechanics of the agglomeration process itself are not completely understood, it is difficult to speculate or demonstrate the interaction between the irradiation of the hydrocarbon fuels and the subsequent decrease in the propensity to agglomerate. Recent research conducted by the present inventor has demonstrated that both gamma radiation and neutron radiation produce the desired anti-agglomeration effect on the fluid hydrocarbon fuels. However, proper neutron irradiation is much more effective in reducing the propensity to agglomerate after extended periods of storage. Recent research has also revealed that destruction of the bacteria and fungi within the hydrocarbon fuel is almost completely effective within the operative range of the radiation intensity required to produce the anti-agglomeration effect for either gamma radiation or neutron radiation.

Research indicates that not only is the type of radiation important, but the intensity and the duration of the radiation must be closely regulated to optimize the subsequent anti-agglomeration propensity of the fuel. The required radiation intensity and radiation period may not be stated in broad ranges for all fluid hydrocarbon fuels. Rather, the optimum radiation intensity and radiation period required appears to vary for each specific type of fuel. Excessive radiation, as well as insufficient radiation will decrease, at least compared to the optimum levels, the anti-agglomeration propensity of the fuels during storage and subsequent use.

While the mechanics of the agglomeration process and the effect produced thereon by previous radiation exposure are not well understood, gas chromatographs taken both before and after neutron irradiation of a hydrocarbon fuel indicate that changes in the bonding structure have occurred as a result of the neutron irradiation. Photographs taken from an electron microscope study of a the typical hydrocarbon RP-1 rocket fuel or high octane gasoline vividly illustrate the efficiency of the irradiation process in increasing the anti-agglomeration propensity of the fuel molecules. As will be well understood by one skilled in this art, an electron microscope produces images of the objects under study by scanning the objects with an electron beam. These electrons heat the object upon which they are focussed. This heating process is closely analagous to the precombustion heating which occurs during the compression stroke in an internal combustion engine. Therefore, the photographs of hydrocarbon molecules produced by an electron microscope will closely resemble the state of the hydrocarbon molecules in an internal combustion engine during the compression stroke, but prior to the passage of the flame wavefront.

Figure 3:
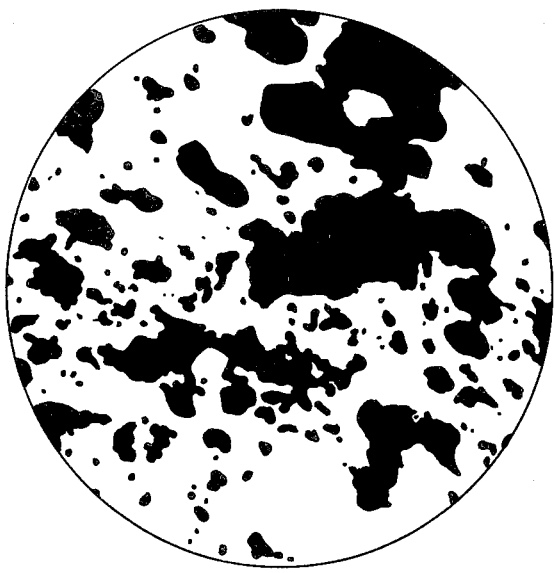
FIG. 3 is an electron microscope photograph of a fluid hydrocarbon fuel taken subsequent to an extended storage period.

FIGS. 3-6 illustrate electron microscope pictures of typical samples of light fluid hydrocarbon fuels, such as RP-1 rocket fuel or gasoline. The electron microscope photograph of the hydrocarbon fuel as shown in FIG. 3 reveals the serious agglomeration effect produced by the heating of the fuel molecules. The large agglomeration masses of fuel molecules are readily apparent. The incomplete combustion of these agglomeration masses results in a reduction in the recovered thermal energy and also causes the production of undesirable pollution byproducts.

Figure 4:
FIG. 4 is an electron microscope photograph of the fluid hydrocarbon fuel after being filtered.

FIG. 4 is an electron microscope photograph taken of the same hydrocarbon fuel after being filtered through a 1.5 micron filter screen subsequent to storage. While the filtering process removes some of the bacteria and fungi and some of the larger agglomeration masses, the heat produced by the incidence of the electron beam upon the hydrocarbon molecules has nonetheless caused agglomeration to occur among the remaining hydrocarbon molecules. Thus, it is apparent from FIG. 4 that the filtering process alone is not capable of producing a significant reduction in the propensity of the hydrocarbon molecules to agglomerate.

Figure 5:
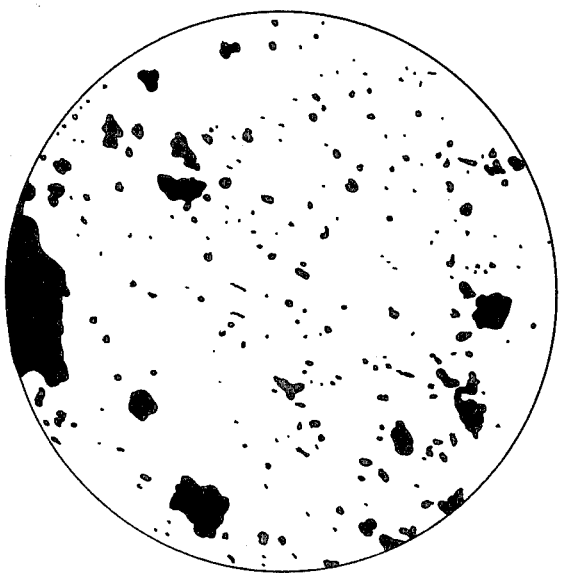
FIG. 5 is an electron microscope photograph of the fuel taken subsequent to gamma irradiation.

In contrast to FIGS. 3 and 4, FIG. 5 is an electron microscope photograph illustrating the lack of a propensity of the hydrocarbon molecules, even after extended periods of storage, to agglomerate when heated by the incidence of the high energy electrons from the electron microscope. However, this sample of the hydrocarbon fuel has been irradiated in a generally optimal manner by gamma radiation prior to the heating process. The lack of large agglomerate masses of hydrocarbon molecules is immediately apparent when FIG. 4 is compared with FIG. 5. However, FIG. 5 illustrates that while gamma radiation is effective in reducing the propensity of the hydrocarbon molecules to agglomerate, the gamma radiation has not effectively prevented all large agglomerate masses.

Figure 6:
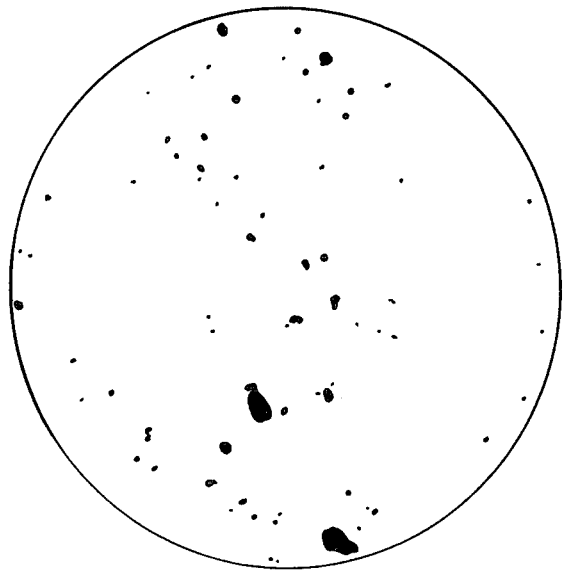
FIG. 6 is an electron microscope photograph of the fuel taken subsequent to neutron radiation.

FIG. 6 is an electron microscope photograph illustrating the lack of a propensity of the hydrocarbon molecules to agglomerate when heated subsequent to storage by the incidence of the high energy electrons from the electron microscope. This sample of the hydrocarbon fuel has been irradiated in a generally optimal manner by neutron radiation prior to the heating process. When the illustration of FIG. 5 is compared with the illustration of FIG. 6, it is immediately apparent that under the conditions represented by FIGS. 5 and 6, the neutron radiation was much more effective in reducing the propensity of the hydrocarbon fuels to agglomerate when subjected to high temperatures. In view of these examples neutron radiation is to be preferred when compared with the effects produced by gamma radiation of the hydrocarbon fuels. However, practical considerations evolving from the production of the neutron and gamma radiation may dictate the selection of one of these forms of nuclear radiation over the other.

Proper irradiation of the hydrocarbon fuel is required to optimize the anti-agglomeration propensity of the fuel molecules. Two critical factors must be considered in optimizing this radiation induced anti-agglomeration propensity. First, the flow rate of the liquid hydrocarbon fuel must be regulated such that the radiation absorbed by a unit volume of the fuel may be precisely controlled. Considering the non-gaussian spatial distributions produced by different sources of radiation, the most practical solution for the above-described constraint comprises the introduction of flow mixers which serve to redistribute the fluid hydrocarbon fuels in a random manner. This allows the radiation incident upon any particular area to be averaged over a large sample of the liquid. This process assures that each unit volume of the hydrocarbon fuel will receive essentially an identical amount of radiant energy from the source.

A second constraint dictates that a sufficient thickness of the fluid must be present during the irradiation process so that more than 90% of the radiation will be absorbed by the hydrocarbon fuel molecules. This high percentage of absorption greatly reduces the amount of escaping radiation which must be contained within the apparatus, and furthermore provides a highly efficient conversion ratio for the neutrons incident upon the hydrocarbon fuel molecules. It is also highly desirable that the radiation source be accurately controlled so that the radiation may be completely discontinued during periods between production runs when maintenance procedures are performed on the apparatus.

The combination of these requirements impose conditions not previously considered in designing neutron or gamma irradiators. While the basic concepts for the production of neutrons and gamma rays have been well known for many years, the specific design for a continuous flow fuel irradiator is considered to be new. Gamma radiation can be produced by utilizing either natural emitters or by using the Bremsstrahlung radiation which occurs subsequent to a high energy electron striking a target such as tantalum. The production of neutrons, other than in a highly complex and very expensive nuclear reactor, is accomplished by implementing any one of the following nuclear reactions:

1. (p,n) Neutron Sources $$Li^7 + P \rightarrow Be^7 + n - 1.646 \text{ Mev} \qquad (a)$$

$$H^3 + P \rightarrow He^3 + n - 0.764 \text{ Mev} \qquad (b)$$

2. (d,n) Neutron Sources $$H^2 + H^2 \rightarrow He^3 + n + 3.265 \text{ Mev} \qquad (a)$$

$$H^3 + H^2 \rightarrow He^4 + n + 17.588 \text{ Mev} \qquad (b)$$

$$Be^9 + H^2 \rightarrow B^{10} + n + 4.362 \text{ Mev} \qquad (c)$$

$$C^{12} + H^2 \rightarrow N^{13} + n - 0.262 \text{ Mev} \qquad (d)$$

$$Li^7 + H^2 \rightarrow Be^8 + n + 15.028 \text{ Mev}$$

or $$Li^7 + H^2 \rightarrow 2He^4 + n + 15.22 \text{ Mev} \qquad (e)$$

3. Photoneutron Sources $$Be^9 + \gamma \rightarrow Be^8 + n + 1.66 \text{ Mev} \qquad (a)$$

$$La^{139} + \gamma \rightarrow La^{138} + n + 0.620 \text{ Mev} \qquad (b)$$

4. Preferred processes for producing neutrons involves the two-step reaction:

$$La^{139} + {}_{-}e^0 \rightarrow Ba^{139} + \gamma$$

$$La^{139} + \Xi \rightarrow La^{138} + n$$

5. A single-step reaction may also be utilized:

$$Be^9 + {}_{-1}e^0 \rightarrow Be^8 + n + {}_{-1}e^0$$

In these reactions energy is added to electrons in a linear accelerator. For the two-step reaction the high energy electrons are used to bombard a lanthanum target, thus producing the intermediate gamma rays. The gamma rays are then captured by other lanthanum atoms, producing a reaction yielding a neutron. In the single step reaction the high energy electrons bombard the Beryllium, thus producing neutrons directly.

The above-described methods of producing neutrons may be facilitated by accelerating charged particles, such as a protons, deutrons, or electrons, through a linear accelerator or other charge acceleration device. However, the acceleration of the charged particle and subsequent bombardment of a target therewith will not provide a uniform beam of radiation, such as that required for the present use. The present invention utilizes a completely redesigned target which is placed immediately adjacent to the liquid hydrocarbon fuel to be irradiated by the neutrons. By utilizing a large target area and causing the liquid hydrocarbon fuel to flow over a large portion of the target, it will be possible to average out the effects of any hot spots or inconsistently illuminated areas of the target.

As was previously discussed, the intensity and total absorption of the radiation must be regulated closely to optimize the anti-agglomeration propensity of the fuel. Preliminary research concerning the irradiation of a high octane fuels by gamma rays indicates that the total energy absorption by the hydrocarbon fuel should be maintained within the range of 95 rads to 110 rads in order to optimize the anti-agglomeration propensity of the fuel. Gamma radiation absorption levels exceeding 110 rads will cause the high octane fuel to form larger particles when heated prior to the combustion process. On the other hand, when neutron irradiation is utilized, much larger energies can be absorbed and thus the coagulation or aggomeration particle size is reduced even more than with gamma irradiation. Preliminary research with neutron radiation indicates that energy absorption in the range of 100 to 1500 rads is optimum for high octane fuels. It will be understood that in this application the term "rad" is intended to conform to the ICRU (1962) definition of 100 ergs of energy absorbed per gram of matter.

II. Apparatus

Figure 2:
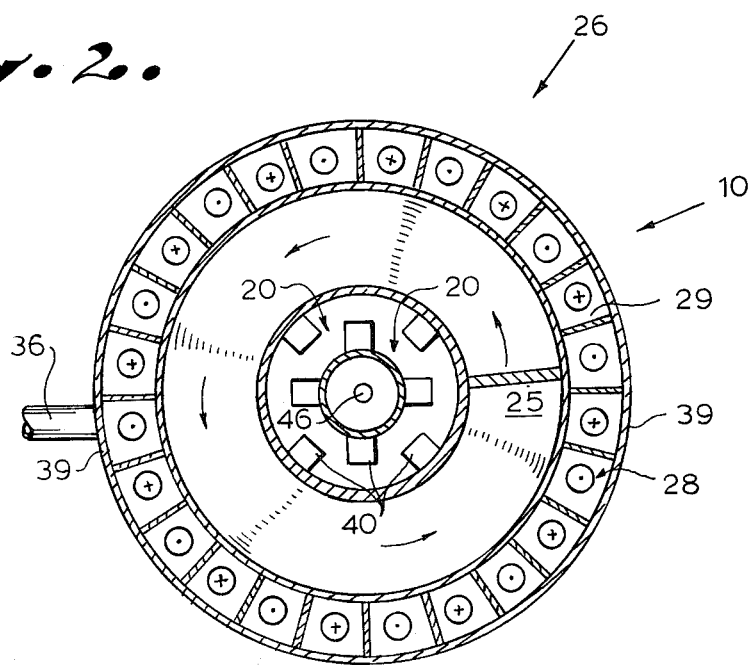
FIG. 2 is a partial top cross-section view of the first preferred embodiment of the present apparatus taken along line 2—2 in FIG. 1.

A first preferred embodiment of an apparatus for executing the previously described process of irradiating liquid hydrocarbon fuels with neutron radiation is illustrated as 10 in FIGS. 1 and 2. An inner irradiating cavity 20 is defined by a first inner surface 22 and a second outer surface 32 generally colateral therewith. The first inner surface 22 has a generally conical shape. The second outer surface 32 is spaced from the first inner surface 22 and has a similar conical shape with the same frustrum angle but with a larger diameter. A plurality of baffles 40 (mixing means) are included within the inner irradiating cavity 20 for disturbing laminar flow of the hydrocarbon fuel flowing therethrough. The baffles 40 are attached in a staggered manner to either the first inner surface 22 or the second outer surface 32 generally perpendicular to the flow of the liquid hydrocarbon fuel being transported therethrough, thereby producing eddy currents within the fuel to assure proper mixture and to assure that each unit volume of fuel receives approximately the same radiation.

A linear accelerator, shown generally as 41 in FIG. 1, is located immediately above the base of the cone defining the first inner surface 22. The linear accelerator 41 increases the kinetic energy of the electrons emitted by an electron source 42 until the electrons pass between the accelerating plates 44. The high energy electrons then pass through an ion window 46 generally adjacent to the accelerating plates 44. The ion window 46 causes the electron beam to disperse as it passes therethrough. The generally normal distribution produced by the ion window dispersion irradiates a wide area along an inner portion of the first inner surface 22. The first inner surface 22 includes a lanthanum or beryllium layer thereon for being bombarded by the high energy electrons. The collisions between a high energy electron and the lanthanum atoms produced the gamma rays are previously described. These gamma rays then combine with other lanthanum atoms for producing the neutrons as desired. On the other hand, if a beryllium surface is provided, the collisions between a high energy electron and the beryllium will produce neutrons directly. A majority of the neutrons produced will proceed outwardly from the first inner surface 22 irradiating the liquid hydrocarbon fuel flowing through inner the irradiating cavity 20.

A generally cylindrical, horizontal spiral outer irradiation cavity 26 surrounds the second outer surface 32. The horizontal spiral outer irradiation cavity 26 includes therein a spiral baffle 25 for guiding the flow of the liquid hydrocarbon fuel generally upward for subsequent passage through an inlet means 24 into the inner irradiating cavity 20. The generally cylindrical horizontal spiral outer irradiation cavity 26 is contained within a generally cylindrical or annular vertical feed cavity 28, including therein a plurality of vertical baffles 29 as shown in FIG. 2.

The liquid hydrocarbon fuel is fed into an inlet 36 which feeds into the vertical feed cavity 28. The fuel then follows a vertically oriented serpentine path about the circumference of the vertical feed cavity 28 until it reaches one of the inlets 37 communicating between the vertical feed cavity 28 and the horizontal spiral of the outer irradiation cavity 26.

The liquid hydrocarbon fuel then spirally ascends through the horizontal spiral outer irradiation cavity 26 and passes through the inlet means 24 into the inner irradiating cavity 20. The fuel is then thoroughly mixed within the inner irradiating cavity 20 by operation of the baffles 40, whereby each volumetric unit of the fuel receives the same neutron radiation from the first inner surface 22. The hydrocarbon fuel then exits the irradiating cavity 20 through outlet means 38.

The diameters of the horizontal spiral outer irradiation cavity 26 and the vertical feed cavity 28 are determined such that nearly all of the neutron radiation which passes through the inner irradiating cavity 20 without being absorbed by the liquid hydrocarbon fuel therein will be absorbed by the liquid hydrocarbon fuels within the horizontal spiral outer irradiation cavity 26 and the vertical feed cavity 28. This absorption will serve as a shield while also improving the reactions efficiency of the neutrons produced by the first inner surface 22. At least 90% of the neutrons produced should be absorbed by the combination of the two irradiating cavities. As an additional safety precaution, a generally cylindrical safety shield 39 communicates around the outside surface of the vertical feed cavity 18. The shield 39 is composed of either cadmium or a boron-iron alloy for absorbing any of the low energy neutrons which pass through all of the hydrocarbon fuels without being absorbed.

It should be apparent at this point that a new and useful process for preventing propagation of bacteria and fungi and for preventing the agglomeration of liquid hydrocarbon fuels has been described. The first preferred embodiment of an apparatus for executing this process has been described as merely an example of the invention as claimed. However, the present invention should not be limited in its application to the details and the constructions illustrated in the accompanying drawings and specification, since this invention may be practiced or constructed in a variety of other different embodiments. Also, it must be understood that the terminology and descriptions employed herein are used solely for the purpose of describing the general process and the preferred embodiment, and therefore should not be construed as limitations on the operability of the invention.

I claim:

1. A process for treating fluid hydrocarbon fuel for retarding agglomeration between the particles thereof when heated, and for retarding the growth of bacteria and fungi therein, said process comprising the step of irradiating said hydrocarbon fuel with neutron radiation wherein said bacteria and fungi are from the group consisting of pseudomonas bacteria, miccrococcus bacteria and fusarium fungi.

2. A process for treating fluid hydrocarbon fuel selected from the group consisting of RP-1 rocket fuel and gasoline for retarding agglomeration between the particles thereof during the precombustion heating, said process comprising the steps of:
   (a) transporting a plurality of unit volumes of said fluid hydrocarbon fuel through an irradiating location; and
   (b) irradiating each of said unit volumes of said fluid hydrocarbon fuel at said irradiation location with neutron radiation, the intensity of said neutron radiation being sufficient to provide absorption by said hydrocarbon fuel in the range of 100 to 1500 rads.

3. The process as described in claim 1 wherein said hydrocarbon fuel is one of RP-1 and gasoline and said nuclear radiation is neutron radiation of sufficient intensity to cause absorption by said hydrocarbon fuel in the range of 100 to 1500 rads.

4. The process as recited in claim 2 wherein step (a) includes the step of mixing each of said unit volume of hydrocarbon fuel when present at said irradiating location for uniformly irradiating all of said particles within said unit volumes of hydrocarbon fuel.

5. The process as recited in claim 4 wherein step (a) includes the initial step of circulating said plurality of unit volumes of said hydrocarbon fuel around said irradiating location prior to said irradiation thereof for absorbing radiation escaping from said irradiating location.

6. The process as recited in claim 2 wherein step (b) includes the step of controllably generating said neutron radiation by accelerating intermediate particles toward a target for initiating an interaction with said target which results in the production of said neutron radiation.

7. The process as recited in claim 6 wherein said intermediate particles are electrons and said target is lanthanum, thereby producing gamma rays which again interact with said lanthium target for producing said neutrons.

8. The process as recited in claim 6 wherein said intermediate particles are electrons and said target is beryllium.

9. An apparatus for treating fluid hydrocarbon fuel for retarding agglomeration between the particles thereof, said apparatus comprising in combination:
   an inner irradiating cavity defined by a first inner surface having a generally conical shape and a correspondingly configured second outer surface collaterally spaced therefrom, said inner irradiating cavity having inlet means and outlet means coupled thereto for enabling a flow of said fluid hydrocarbon fuel through said inner irradiating cavity;
   a source of nuclear radiation for irradiating each unit volume of said fluid hydrocarbon fuel within said inner irradiating cavity, wherein said first inner surface is selected from the group consisting of lanthanum and beryllium and is a target responsive to the bombardment thereof by electromagnetic energy, wherein said nuclear radiation comprises neutron radiation and is emitted from said first surface for irradiating said inner irradiating cavity and said fluid hydrocarbon fuel therein; and
   shield means for absorbing and attenuating nuclear radiation passing through said irradiating cavity without being absorbed or attenuated by said fluid hydrocarbon fuel.

10. The apparatus as described in claim 9 wherein said first inner surface is lanthanum, and wherein said electromagnetic energy is gamma radiation.

11. The apparatus as described in claim 10 wherein said gamma radiation is generated by bombarding said first inner surface with high energy electrons.

12. The apparatus as described in claim 11 wherein said high energy electrons are produced by a linear accelerator.

13. The apparatus as described in claim 9 wherein said first inner surface is beryllium, with said beryllium emitting said neutrons when bombarded with high energy electrons.

14. The apparatus as described in claim 8 further including mixing means for disrupting the laminar flow of and mixing of said fluid hydrocarbon fuel flowing through said inner irradiating cavity, thereby providing a uniform irradiation of said fluid hydrocarbon fuel within said inner irradiating cavity.

15. The apparatus as described in claim 14 wherein said mixing means comprises baffle means within said inner irradiating cavity.

16. The apparatus as described in claim 9 wherein said input means and said shield means comprise circulating means for circulating said fluid hydrocarbon fuel around an exterior portion of said second outer surface prior to entering said irradiating cavity, thereby attenuating nuclear radiation passing through said inner irradiating cavity.

* * * * *

UNITED STATES PATENT AND TRADEMARK OFFICE
CERTIFICATE OF CORRECTION

PATENT NO. : 4,172,019
DATED : October 23, 1979
INVENTOR(S) : David D. Woodbridge It is certified that error appears in the above-identified patent and that said Letters Patent are hereby corrected as shown below:

Claim 14, line 44, delete "8" and insert therefor --9--.

Signed and Sealed this

Fifteenth Day of January 1980

[SEAL]

Attest:

SIDNEY A. DIAMOND

Attesting Officer    Commissioner of Patents and Trademarks